United States Patent [19]
Murphy

[11] Patent Number: 6,042,361
[45] Date of Patent: Mar. 28, 2000

[54] MOLD FOR USE IN PLASTIC INJECTION MOLDING SYSTEM AND VENTING PIN ASSEMBLY FOR USE THEREIN

[75] Inventor: John F. Murphy, Imlay City, Mich.

[73] Assignee: Larry J. Winget, Leonard, Mich.

[21] Appl. No.: 09/041,333

[22] Filed: Mar. 12, 1998

[51] Int. Cl.$^7$ .............................. B29C 33/10; B29C 45/40
[52] U.S. Cl. .............................. 425/546; 249/67; 264/572; 425/130; 425/444; 425/556; 425/812
[58] Field of Search ........................... 264/572; 425/444, 425/556, 577, 130, 812, 546; 249/67

[56] References Cited

U.S. PATENT DOCUMENTS

| | | | |
|---|---|---|---|
| 3,555,620 | 1/1971 | Bucy | 425/149 |
| 3,645,492 | 2/1972 | Edlis | 425/556 |
| 4,009,978 | 3/1977 | Hanning | 425/444 |
| 4,123,218 | 10/1978 | Krall | 425/812 |
| 4,531,703 | 7/1985 | Underwood | 425/556 |
| 5,284,429 | 2/1994 | Schneider et al. | 425/130 |
| 5,356,284 | 10/1994 | Sheffield | 425/556 |
| 5,545,366 | 8/1996 | Lust et al. | 425/812 |
| 5,635,221 | 6/1997 | Han | 264/572 |
| 5,665,281 | 9/1997 | Drummond | 425/812 |
| 5,730,926 | 3/1998 | Matsumoto et al. | 425/130 |

FOREIGN PATENT DOCUMENTS

| | | | |
|---|---|---|---|
| 2-62218 | 3/1990 | Japan | 425/556 |
| 3-222713 | 10/1991 | Japan | 425/556 |
| 5-74827 | 3/1993 | Japan | 425/444 |
| 96/02379 | 2/1996 | WIPO . | |

*Primary Examiner*—Robert Davis
*Attorney, Agent, or Firm*—Brooks & Kushman P.C.

[57] ABSTRACT

A mold for use in a plastic injection molding system includes a venting pin assembly which can not only vent an article-defining cavity in the mold but can also eject a formed plastic article in an open position of the mold. A porous insert of the assembly permits air from the article-defining cavity to flow there-through while preventing the passage of molten plastic from the article-defining cavity in a closed position of the mold. A venting pin of the assembly in the form of a hollow ejector pin has an elongated aperture formed therethrough to permit the flow of air therethrough. The porous insert is positioned in the aperture at a gas hole formed through an end surface of the ejector pin. The insert and the gas hole are sized so that the insert and the end surface help to form a "Class A" surface on the article formed in the article-defining cavity.

8 Claims, 1 Drawing Sheet

MOLD FOR USE IN PLASTIC INJECTION MOLDING SYSTEM AND VENTING PIN ASSEMBLY FOR USE THEREIN

CROSS-REFERENCE TO RELATED APPLICATIONS

This application is related to U.S. patent applications entitled "Mold For Use In A Gas-Assisted Injection Molding System And Gas Pin Assembly For Use Therein" and filed Sep. 22, 1997 and having U.S. Ser. No. 08/935,013. This application is also related to U.S. patent applications entitled "Mold For Use In A Gas-Assisted Injection Molding System And Ejector Pin Subsystem For Use Therein" filed Apr. 14, 1998 and having U.S. Ser. No. 09/059,947 and Ser. No. 09/060,232, filed Apr. 14, 1998, entitled "Mold For Use In A Gas-Assisted Injection Molding System And Adjustable Over-flow Pin Assembly For Use Therein" now U.S. Pat. No. 5,869,105.

TECHNICAL FIELD

This invention relates to molds and venting pin assemblies for use therein and, in particular, molds for use in plastic injection molding systems and venting pin assemblies for use therein.

BACKGROUND ART

It is often necessary to vent the air out of the article-defining cavity of a plastic injection mold, either during a plastic injection step, during a pressurized gas injecting step, or during a step of venting gas from a gas-assisted injection molded part. Prior attempts to vent the cavity are often expensive and/or complex. attempts to vent the cavity are often expensive and/or complex.

U.S. Pat. No. 5,665,281 discloses a method of molding using a venting pin which, in one embodiment, can also serve as an ejector pin.

U.S. Pat. No. 3,555,620 discloses a mold for pressure injected materials in which the ejector pins and their associated board acts as a venting means.

U.S. Pat. No. 5,356,284 discloses a stack mold, including gas ejection of pieces having a reciprocable gas blow-off pin slidably trapped in a pin recess and including an enlarged bottom portion and a narrow upper portion that includes an internal gas passage.

U.S. Pat. No. 5,545,366 discloses an arrangement for molding in which one ejector pin is located at the distal end of a part to ensure adequate mold gas venting during the final fill stage.

U.S. Pat. No. 4,123,218 discloses a blow pin assembly having a narrow gap between a main body and a sleeve to provide a vent for trapped air.

U.S. Pat. No. 3,645,492 discloses an ejector actuator for a plastic injection mold for introducing air or other fluid into an associated cylinder.

U.S. Pat. No. 4,531,703 discloses an air ejector which moves an ejector valve into the mold and injects air between a molded article and the mold to eject the article.

The U.S. patent to Schneider et al., U.S. Pat. No. 5,284,429, discloses a mold and gas pin assembly for use in the injection molding of a thermoplastic article. A fluid supply passageway is provided in the mold to allow fluid to be ejected through and communicated to either the thermoplastic flow path or into the article-defining cavity. An end passage of the thermoplastic flow path has a plug disposed therein. The plug includes a porous core which permits the flow of low viscosity fluid such as a gas in either direction therethrough, but prevents the passage of molten thermoplastic therethrough.

SUMMARY OF THE INVENTION

An object of the present invention is to provide a mold for use in a plastic injection molding system and venting pin assembly for use within an article-defining cavity of the mold wherein air from the article-defining cavity of the mold is vented through the assembly which also helps to define the article-defining cavity.

Another object of the present invention is to provide a mold for use in a plastic injection molding system and a venting pin assembly which partially defines an article-defining cavity within the mold and which also allows air from the article-defining cavity to vent therethrough.

In carrying out the above objects and other objects of the present invention, a mold for use in a plastic injection molding system is provided. The mold includes a first mold half and a second mold half. The first and second mold halves are movable relative to each other between an open position and a closed position. The first and second mold halves define an article-defining cavity. The mold also includes a venting pin assembly. The assembly includes a venting pin slidably fit within the second mold half and which partially defines the article-defining cavity in a closed position of the mold and is movable relative to the second mold half to eject an article formed within the article-defining cavity in the open position of the mold. The venting pin has an elongated aperture formed completely therethrough in communication with the article-defining cavity to permit air from the article-defining cavity to flow therethrough. The assembly also includes a porous insert positioned in the aperture. The insert permits the flow of air therethrough but prevents the passage of molten plastic from the article-defining cavity into the aperture.

Preferably, the porous insert comprises a sintered material selected from the group consisting of aluminum, copper, nickel, steel, bronze, porcelain, and brass.

Still further in carrying out the above objects and other objects of the present invention, in a mold having a first mold half and a second mold half a venting pin assembly is provided. The first and second mold halves are movable relative to each other between an open position and a closed position. The first and second mold halves define an article-defining cavity. The assembly includes a venting pin adapted to slidably fit within the second mold half to partially define the article-defining cavity in the closed position of the mold and is movable relative to the second mold half to eject an article formed within the article-defining cavity in the open position of the mold. The venting pin has an elongated aperture formed completely therethrough to permit air from the article-defining cavity to flow therethrough. The assembly also includes a porous insert positioned in the aperture. The insert permits the flow of air therethrough but prevents the passage of molten plastic from the article-defining cavity into the aperture.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
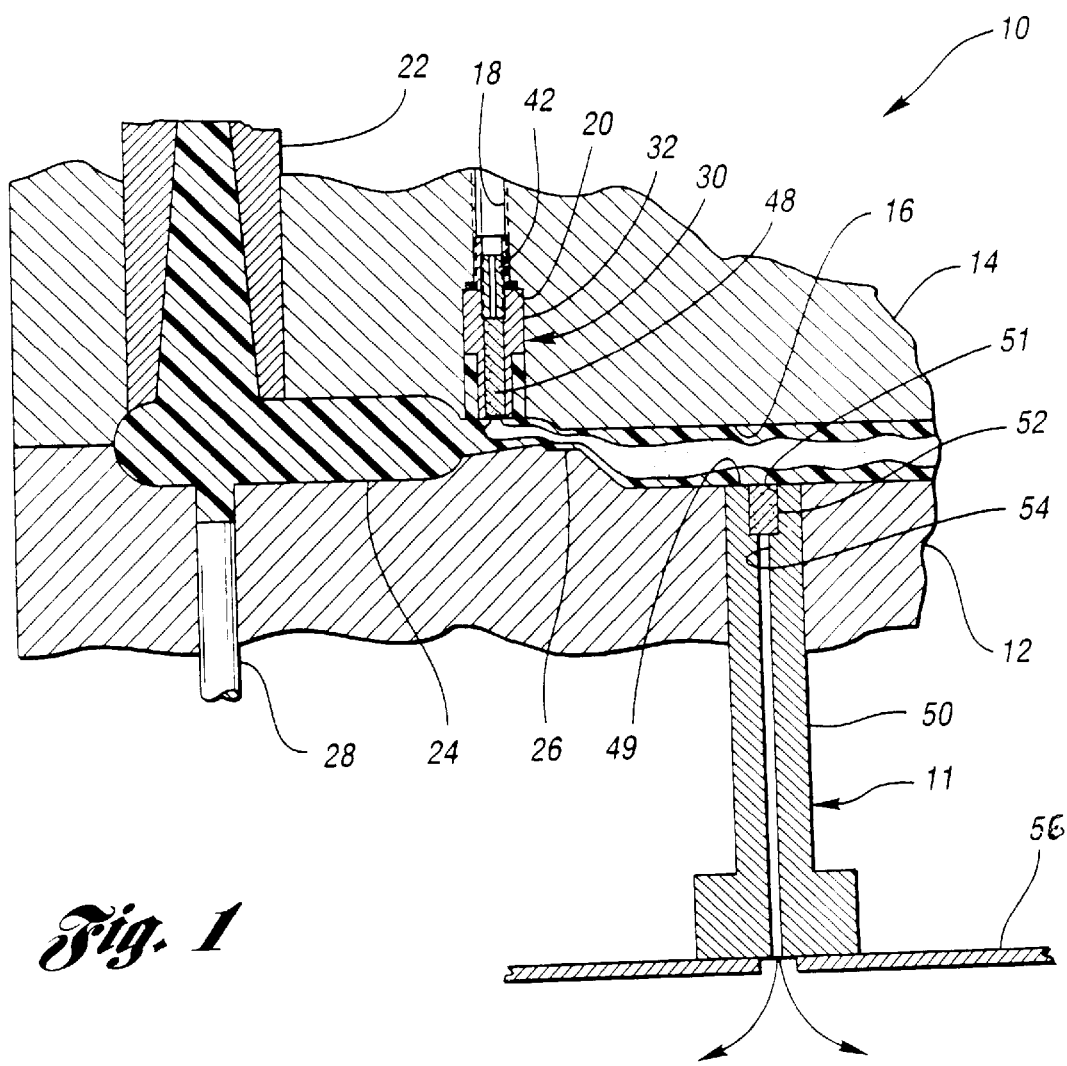
FIG. 1 is a view, partially broken away and in cross-section, of a mold constructed in accordance with the present invention showing air flowing through a venting pin assembly also constructed in accordance with the present invention; the venting pin assembly is shown enlarged for illustration purposes.

Referring now to the drawing FIGURE, there is illustrated in FIG. 1 a mold, generally indicated at 10, including a venting pin assembly, generally indicated at 11, for use in a gas-assisted injection molding system. However, it is to be understood that the mold 10 and the venting pin assembly 11 may also be used in a conventional plastic injection molding system.

The mold 10 includes a first mold half 12 and a second mold half 14. The first and second mold halves 12 and 14, respectively, are movable relative to each other between an open position and a closed position as shown in FIG. 1, wherein the first and second mold halves 12 and 14, respectively, define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26.

Ejector pins such as a pin 28 and a venting pin 50 of the venting pin assembly 11 extend through and are slidably fit within the first or movable mold half 12 to eject a solid completed part in an open position of the mold 10.

The mold 10 also includes a gas pin assembly, generally indicated at 30. As described in the above-noted application, the gas pin assembly 30 includes a one-piece housing 32, a base portion of which is threadedly secured to the second mold half 14 at the interior surface 20 thereof so that the gas pin assembly 30 can be readily removed from the second mold half 14 in the open position of the mold 10. A rubber O-ring is provided about the base portion to seal the housing 32 within the second mold half 14.

The housing 32 of the assembly 30 also includes a hexagonal head portion so that the assembly 30 can be readily removed from the second mold half 14 in the open position of the mold 10 by a conventional tool (not shown).

The housing 32 of the assembly 30 also includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass, which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

The set screw 42 is continuously adjustably secured within the base portion of the housing 32 along the aperture to permit inserts of varying sizes and micron sizes to be located within the aperture.

The base portion of the housing 32 is internally threaded and the set screw 42 is externally threaded. The set screw 42 is completely threaded in the base portion of the housing 32 at each of the plurality of possible holding positions of the set screw 42 within the base portion of the housing 32.

The venting pin 50 of the assembly 11 has an end face or surface 49 with a gas hole 51 formed therethrough to permit air from the article-defining cavity 16 to pass through an insert 52 positioned in an elongated aperture 54 of the pin 50. The elongated aperture 54 is formed completely through the venting pin 50 in communication with the article-defining cavity 16 through the gas hole 51. The insert 52 permits the flow of air therethrough but prevents the passage of molten plastic through the gas hole 51 and into the aperture 54. The venting pin 50 may comprise a conventional ejector pin which has been hollowed out to form the aperture 54 therethrough.

The end surface 49 of the ejector pin 50 together with the insert 52 partially define the article-defining cavity 16 in a closed position of the mold 10. The venting pin 50 is movable relative to the mold half 12 to eject an article formed within the article-defining cavity 16 in an open position of the mold 10 upon relative movement of an apertured ejector plate 56 on which the venting pin 50 is mounted. In particular, the insert 52 and the gas hole 51 are sized so that the insert 52 and the end surface 49 form a "Class A" surface on the article formed within the article-defining cavity 16.

The insert 52 may be of a porosity and of a material suitable for the particular molding process, plastic material, etc. For example, the insert may comprise any of the sintered materials from which the insert 48 is made.

The mold 10 and venting pin assembly 11 for use therein are constructed in accordance with the present invention and provide numerous advantages. For example, the venting pin assembly 11 allows plastic previously ejected into mold 10 and into the article-defining cavity 16 to push air out of the cavity 16 with no mechanics involved. The assembly 11 will not allow plastic to flow out of the cavity 16 at the assembly 11, only air displaced by the flow of molten plastic. Of particular advantage is positioning the assembly 11 within the mold half 12 at a rib and/or plastic mold detail that cannot normally be vented by a parting line of the mold 10.

The venting pin 50 of the assembly 11 is of a single metal construction and preferably has a porous bronze insert 52. The porous bronze insert 52 can be serviced at the molding site if required by replacing the venting pin assembly 11 like any other ejector pin. The porous bronze insert 52 allows air to flow evenly out of the article-defining cavity 16 of the mold 10 and also filters out foreign particles down to 20 microns. The porous bronze insert 52 can be exchanged for other sized porous inserts which may be of a different material for various requirements for air flow while at the same time prevent passage of molten plastic into the aperture 54 (i.e. different micron settings). This gives the molding operation additional flexibility.

The venting pin assembly 11 can be made in various lengths and sizes without departing from the spirit of the present invention.

While the best mode for carrying out the invention has been described in detail, those familiar with the art to which this invention relates will recognize various alternative designs and embodiments for practicing the invention as defined by the following claims.

What is claimed is:

1. A mold for use in a plastic injection molding system, the mold comprising:

a first mold half;

a second mold half, the first and second mold halves being movable relative to each other between an open position and a closed position, wherein the first and second mold halves define an article-defining cavity; and a venting pin assembly including:

a venting pin slidably fit within the second mold half and which partially defines the article-defining cavity in a closed position of the mold and is movable relative to the second mold half to eject an article formed within the article-defining cavity in the open position of the mold, the venting pin having an elongated aperture formed completely therethrough in communication with the article-defining cavity to permit air from the article-defining cavity to flow therethrough; and a porous insert positioned in the aperture, the insert permitting the flow of air therethrough but prevents the passage of molten plastic from the article-defining cavity into the aperture wherein the venting pin has an end surface with a gas hole formed therethrough to permit the air from the article-defining cavity to flow therethrough, the insert being located at the hole so that the insert and the end surface partially defines the article-defining cavity wherein the insert and the gas hole are sized so that the end surface and the insert help to form a "Class A" surface on the article formed in the article-defining cavity and the venting pin including means for holding the insert in position within the aperture.

2. The mold as claimed in claim 1 wherein the venting pin is a one-piece, hollow ejector pin.

3. The mold as claimed in claim 1 wherein the porous insert comprises a sintered material.

4. The mold as claimed in claim 3 wherein the sintered material is selected from the group consisting of aluminum, copper, nickel, steel, bronze, porcelain, and brass.

5. In a mold having a first mold half and a second mold half movable relative to each other between an open position and a closed position, the mold halves defining an article-defining cavity, a venting pin assembly comprising:

a venting pin adapted to slidably fit within the second mold half to partially define an article-defining cavity in the closed position of the mold and to be movable relative to the second mold half to eject an article formed within the article-defining cavity in the open position of the mold, the venting pin having an elongated aperture formed completely therethrough to permit air from the article-defining cavity to flow therethrough; and a porous insert positioned in the aperture, the insert permitting the flow of air therethrough but preventing the passage of molten plastic from the article-defining cavity into the aperture wherein the venting pin has an end surface with a gas hole formed therethrough to permit the air from the article-defining cavity to flow therethrough, the insert being located at the hole so that the insert and the end surface partially define the article-defining cavity; wherein the insert is positioned at the gas hole and the gas hole is sized so that the end surface and the insert help to form a "Class A" surface on the article formed in the article-defining cavity; the venting pin including means for holding insert in position within the aperture.

6. The assembly as claimed in claim 5 wherein the venting pin is a one-piece, hollow ejector pin.

7. The assembly as claimed in claim 5 wherein the porous insert comprises a sintered material.

8. The assembly as claimed in claim 7 wherein the sintered material is selected from the group consisting of aluminum, copper, nickel, steel, bronze, porcelain, and brass.

* * * * *